US011853176B1

(12) United States Patent
Chilamakuri et al.

(10) Patent No.: US 11,853,176 B1
(45) Date of Patent: Dec. 26, 2023

(54) SERVICE-COMPATIBLE FAULT TOLERANCE AND ACCLIMATION

(71) Applicant: SAP SE, Walldorf (DE)

(72) Inventors: Sateesh Babu Chilamakuri, Tirupati (IN); Sathya G, Kerala (IN); Ramya Nandakumaran, Chennai (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/836,334

(22) Filed: Jun. 9, 2022

(51) Int. Cl.
| | |
|---|---|
| *G06F 11/20* | (2006.01) |
| *G06F 11/30* | (2006.01) |
| *G06F 11/34* | (2006.01) |
| *G06F 11/07* | (2006.01) |
| *G06F 11/14* | (2006.01) |

(52) U.S. Cl.
CPC ...... *G06F 11/2025* (2013.01); *G06F 11/0709* (2013.01); *G06F 11/0793* (2013.01); *G06F 11/1438* (2013.01); *G06F 11/1484* (2013.01); *G06F 11/2048* (2013.01); *G06F 11/3006* (2013.01); *G06F 11/3055* (2013.01); *G06F 11/3442* (2013.01); *G06F 11/3495* (2013.01); *G06F 2201/85* (2013.01)

(58) Field of Classification Search
CPC ............ G06F 11/2025; G06F 11/0709; G06F 11/0793; G06F 11/1438; G06F 11/1484; G06F 11/2048; G06F 11/3006; G06F 11/3055; G06F 11/3442; G06F 11/3495; G06F 2201/85
See application file for complete search history.

(56) References Cited

U.S. PATENT DOCUMENTS

| | | | | |
|---|---|---|---|---|
| 11,392,422 | B1* | 7/2022 | Filiz | G06F 9/45558 |
| 11,470,144 | B1* | 10/2022 | Maurya | H04L 67/10 |
| 11,677,681 | B1* | 6/2023 | Alt | H04L 43/0882 |
| | | | | 709/226 |
| 2015/0089274 | A1* | 3/2015 | Mares | H04L 51/224 |
| | | | | 714/4.11 |
| 2015/0363724 | A1* | 12/2015 | Chatterjee | G06Q 10/06313 |
| | | | | 705/7.23 |
| 2016/0337180 | A1* | 11/2016 | Rao | H04L 67/142 |
| 2020/0007456 | A1* | 1/2020 | Greenstein | G06F 9/45558 |
| 2020/0065086 | A1* | 2/2020 | Woodmansee | G06F 9/5072 |
| 2020/0285652 | A1* | 9/2020 | Wang | H04L 61/5007 |
| 2020/0412825 | A1* | 12/2020 | Siefker | H04L 67/1027 |
| 2021/0133183 | A1* | 5/2021 | Biswas | G06F 16/21 |
| 2021/0149879 | A1* | 5/2021 | Kancharla | G06F 16/2379 |
| 2021/0263663 | A1* | 8/2021 | Bansal | G06F 3/0665 |
| 2022/0121455 | A1* | 4/2022 | Hoban | H04L 67/1097 |
| 2022/0237090 | A1* | 7/2022 | Ferreira | H04L 67/1095 |

* cited by examiner

*Primary Examiner* — Bryce P Bonzo
*Assistant Examiner* — Michael Xu
(74) *Attorney, Agent, or Firm* — SCHWEGMAN LUNDBERG & WOESSNER, P.A.

(57) ABSTRACT

In an example embodiment, a solution is provided to build a generic service failover framework that can be packaged as a library and implemented by many different microservices, whether on-premises or in the cloud. Each application can implement/add/hook this service to obtain the benefits of handling failover gracefully, as well as coming with some customizable options to provide a complete failover framework.

20 Claims, 4 Drawing Sheets

SERVICE-COMPATIBLE FAULT TOLERANCE AND ACCLIMATION

TECHNICAL FIELD

This document generally relates to microservice software environments. More specifically, this document relates to service-compatible fault tolerance and acclimation.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany. Another example is Cloud Application Lifecycle Management (CALM)®, from SAP SE of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Microservice applications can be deployed on-premises or in the cloud, but in either case a technical issue arises when a microservice fails. Specifically, it may be difficult to handle the failure of a microservice when clients are making requests of the microservice. An example of this is hereby provided.

Assume an application that provides functionality such as scheduling, publication, and commenting. Each of these pieces of functionality may be its own microservice. For example, the scheduling microservice may take care of scheduling a report based on defined properties. There can be multiple reasons that such a microservice may fail, such as configuration errors, timeout errors, resource or platform-specific issues, loss of connection to the server, or scheduling taking a longer time to run than is permissible.

When the scheduling service goes down, all of the scheduling jobs already requested will not be triggered and instead will become part of a pending or failed state. Additionally, for large enterprise customers, there may be dependent jobs which rely on results from scheduling jobs, thus causing a cascading effect. Until the root cause is identified to bring the scheduling microservice back up again, such as by analyzing trace logs, there will be considerable down time.

One solution would be to have redundant instances of a microservice running, possibly on multiple servers, and to serve a connection pointer to an available instance when a service request is received from a client. Such a solution, however, would need to be customized for each microservice and handled via the microservice itself, or at least a portion of the microservice dedicated to managing incoming requests, which of course itself could be unavailable or down.

In an example embodiment, a solution is provided to build a generic service failover framework which can be packaged as a library and implemented by many different microservices, whether on-premises or in the cloud. Each application can implement/add/hook this service to obtain the benefits of handling failover gracefully, as well as coming with some customizable options to provide a complete failover framework.

Figure 1:
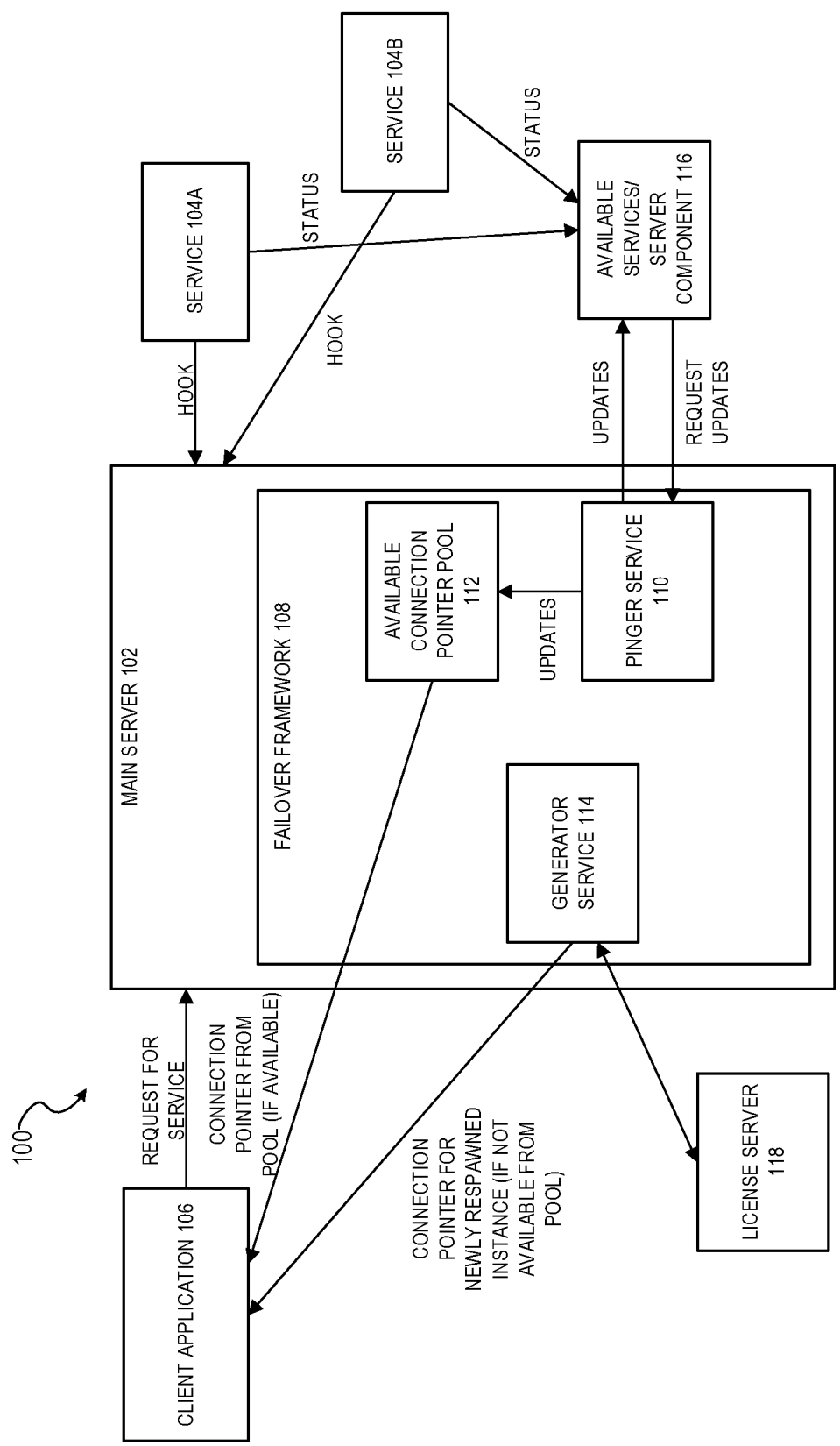
FIG. 1 is a block diagram illustrating a generic service failover framework, in accordance with an example embodiment.

FIG. 1 is a block diagram illustrating a generic service failover framework 100, in accordance with an example embodiment. A main server 102 is hooked to a plurality of services 104A, 104B. Customers may register their own client applications, such as client application 106, with the main server 102. The main server 102 has visibility to the services 104A, 104B.

During a registration process for the client application 106, a parameter may be specified indicating whether to opt for the failover for any of the services 104A, 104B. If so, then for each such service 104A, 104B, the customer may complete a configuration file. The configuration file and the process for completing it will be described in more detail below.

Once the registration is completed, all requests for the services 104A, 104B are received by the main server 102. The failover framework 108 within the main server 102 contains a pinger service 110, an available connection pointer pool 112, and a generator service 114.

The pinger service 110 is responsible for determining a current status for each instance of each service. This may be accomplished by periodically requesting status information from an available services/server component 116. The available services/server component 116 oversees the instances of services running on various servers, and provides the pinger service 110 with an updated list of which of those services/servers are available. It should be noted that "available" does not necessarily mean merely "up and running". Indeed, available means that the service instance is operating above some minimum level of service. In other words, a service instance may be running, but may be considered to not be available for any number of reasons relating to preventing the service from providing a minimum level of service. While catastrophic failure certainly is one such reason, the present framework is more useful in cases where the failure is not catastrophic, for reasons that will be described later.

In an example embodiment, the pinger service 110 may query the available services/server component 116 once every 30 seconds for updated information about availability. It should be noted, however, that any interval may be used. Additionally, in some example embodiments, the pinger service 110 itself may be more passive, potentially using a push-based subscription service rather than actively pinging the available services/server component 116. In such a push-based subscription implementation, the pinger service 110 subscribes to the available services/server component 116, perhaps via a message broker such as Kafka. When the available services/server component 116 detects a change in the availability status of one or more services/servers, it pushes a message to the pinger service 110 notifying the pinger service 110 of the change.

The information from the pinger service 110 is then used to maintain the available connection pointer pool 112, which includes a connection pointer for each available connection. The available connection pointer pool 112 may be maintained as a data structure that has the available connection pointers. Internally, this may be stored as a hash map structure, where the key will be the service name and identification and the value will be the list of servers where the service is hosted and available. Table 1 below is an example of such a hash map structure:

TABLE 1

| Service Name and ID | List of available servers where the service is hosted |
|---|---|
| Service_A_ID | Server 1 |
|  | Server 2 |
|  | Server 3 |
| Service_B_ID | Server 2 |
|  | Server 3 |

Thus, when a request for a service is received by the main server 102, assuming the requested service has been registered as being one that utilizes the failover framework 108, the request is attempted to be fulfilled by one of the available connections in the available connection pointer pool 112, assuming there is one. This is performed by identifying the list of available servers in the hash map data structure by finding the value(s) for the corresponding service name and ID.

If there are available connections, then one of the available connections is selected and its corresponding connection pointer returned to the client application 106, which can then use the corresponding connection pointer to use the corresponding service. If there are multiple available connections, then a selection scheme may be used for selecting the connection pointer to return. In an example embodiment, the selection scheme is random. In other example embodiments, some sort of load balancing criteria may be used to select the most appropriate connection to assign to the client application.

It should also be noted that the definition of what an "available" connection is may vary depending upon the client application and/or end user performing the requesting of the service. Certain client applications and/or end users may be given priority for service instances, and indeed some service instances may be deemed "dedicated" to particular client applications and/or end users or end user types. For example, in table 1 above, the hash map structure would appear to indicate that server 1, server 2, and server 3 all have available connections for Service A, but it may be that server 1 has been reserved for users at the vice president level or higher in a corporate hierarchy. Thus, if a vice president's client application is requesting the service, then server 1, server 2, and server 3 will all be considered available (and their corresponding service instances may be used for randomly selecting a service instance to assign to the vice president's client application). On the other hand, if an intern's client application is requesting Service A, then only server 2 and server 3 may be considered to be available (and only their corresponding service instances may be used for randomly selecting a service instance to assign to the intern's client application).

One potential technical issue that may arise is that the frequency of update of the hash map structure for the available connection pointer pool 112 may be such that it is possible for a service which the pinger had previously indicated was available to become unavailable while the available connection pointer pool 112 is being updated with the status from the previous ping, resulting in the available connection pointer pool 112 having outdated information for a brief interval. For example, if the pinger service 110 queries (or otherwise gets updates from) the available services/server component 116 every 30 seconds, and the hash map structure for the available connection pointer pool 112 gets updated every 30-seconds, then the available connection pointer pool 112 can potentially have out-of-date information for approximately 30-60 seconds when a service initially becomes unavailable. If a connection request comes in during this period, it is possible to assign a connection pointer from the available connection pointer pool 112 even though the connection pointer will not work. In order to address this technical issue, in an example embodiment, an additional availability check is performed after the connection pointer has been assigned to the client application 106 but prior to the connection pointer being sent to the client application 106, by requesting the pinger service 110 to update the status of the assigned connection pointer.

If there are no available connections for the requested service (or if all available connections wind up failing to be established for some reason), then an additional failover process may occur, this time using the generator service 114.

The additional failover process involves automatically attempting to respawn the requested service using parameters specified in the configuration file. While respawning may not help in cases of catastrophic failure of the service (e.g., all the servers that would host an instance of the service are completely shut down), in many cases respawning the service does result in the service becoming available again. As with personal computers, sometimes merely restarting a service can sometimes solve whatever problem was occurring with the service, even if only temporarily. The issue is, however, that respawning a service is a lot more complicated than restarting a personal computer.

More particularly, when registering with the main server 102, the customer provides a configuration file, which provides details regarding parameters such as tenant identification, connection identification, central processing unit (CPU) allocated for the service, maximum requests per service, and maximum instances per services, as in the below configuration file:

Tenant:
Connection:
CPU Allocated for Service
Maximum requests per Service
Maximum instances per
Service Upon determining that there are no available connections for the requested service (or if all available connections wind up failing to be established for some reason), then the generator service 114 first attempts a license check to determine whether the client application 106 has an appropriate license to run the service. This may involve querying a license server 118 with an identification of the requested service and an identification of the client application. Assuming the license check is successful, then the generator service 114 spawns a new instance of the requested service on a server using the information from the configuration file.

In some example embodiments, machine learning techniques may be utilized to augment the above processes. Specifically, a machine learning model may be trained by a machine learning algorithm to recommend values for the configuration file to customers to use when completing the configuration file when registering with the failover framework. Specifically, training data such as client application data and customer type as well as values for one or more parameters of the configuration file used for customers associated with the training data can be fed into a machine learning algorithm to train the machine learning model. At runtime, the application data and customer type of the client application registering with the failover framework may be submitted to the trained machine learning model to make recommendations for values for one or more of the fields of the configuration file.

The machine learning algorithm may iterate among various weights that will be multiplied by various input variables and evaluate a loss function at each iteration, until the loss function is minimized, at which stage the weights for that stage are learned. The past training data may include manually labeled data. Specifically, the weights are multiplied by the input variables as part of a weighted sum operation, and the weighted sum operation is used by the loss function.

The machine-learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The machine-learned models can also be retrained by passing new training data, some of which may have been labeled via user feedback, to the machine-learning algorithm at a later time.

Figure 2:
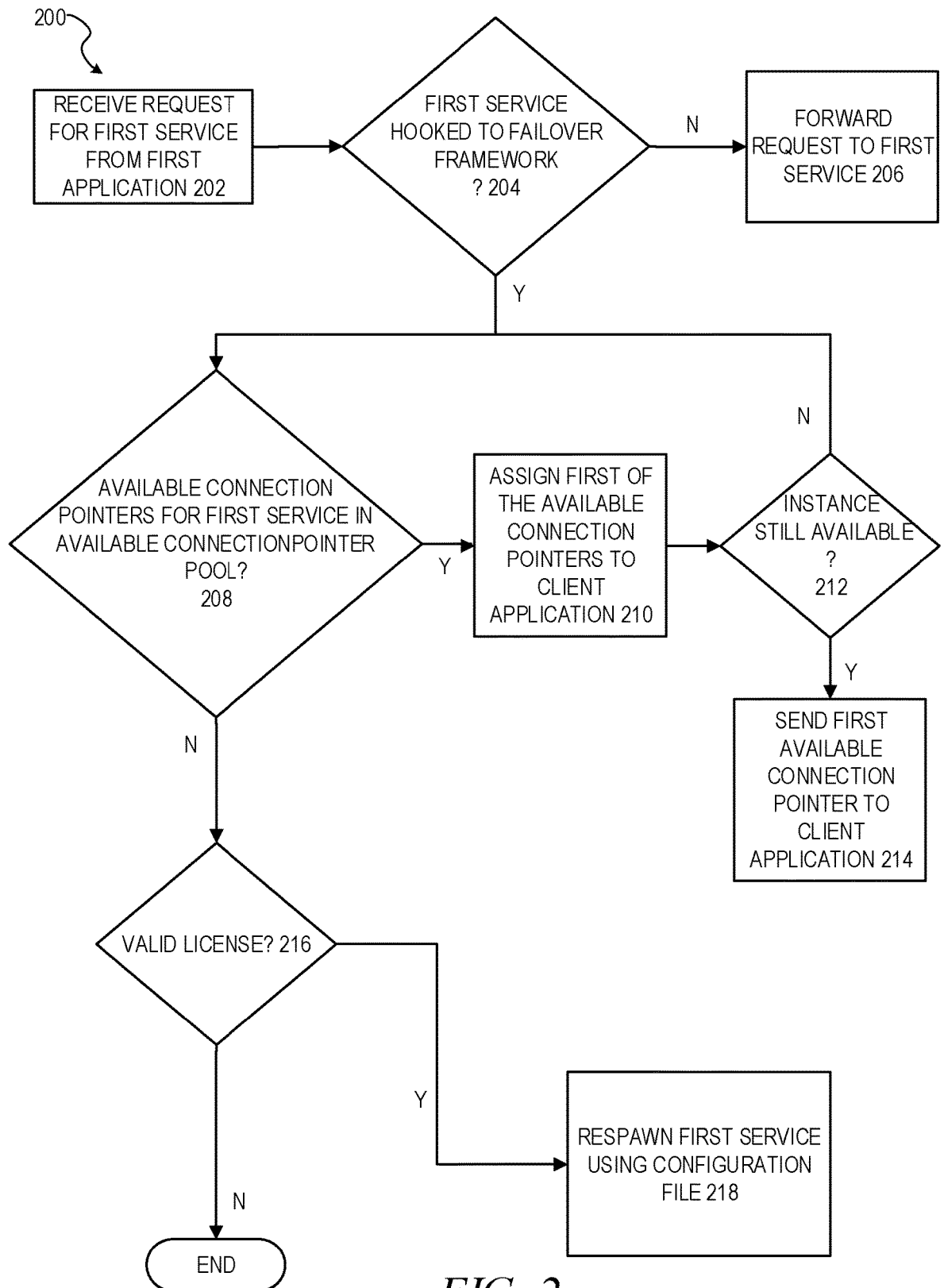
FIG. 2 is a flow diagram illustrating a method of handling service faults, in accordance with an example embodiment.

FIG. 2 is a flow diagram illustrating a method 200 of handling service faults, in accordance with an example embodiment. At operation 202, a request for a first service is received from a client application. At operation 204, it is determined if the first service is hooked to a failover framework. The failover framework is not specific to the first service (i.e., multiple services may be hooked to the same failover framework). If not, then at operation 206, the request is forwarded to the first service (for handling using traditional means).

If the first service, however, is hooked to the failover framework, then at operation 208, an available connection pointer pool is examined to determine if there are any available connection pointers for the first service. The available connection pointer pool may be filled with connection pointers based on service availability information provided by a pinger service.

If there are available connection pointers for the first service, then at operation 210 a first of the available connection pointers may be assigned to the client application. It should be noted that while the term "first" is used here, it is not meant to imply any sort of ordering for the connection pointers. Rather, in this context, it merely means that one of the available connection pointers is assigned, and the term 'first' is merely used so that subsequent references to the selected connection pointer will be unambiguous. As mentioned above, if there are multiple available connections for the service, then the first connection pointer may be selected randomly from those multiple available connections.

At operation 212, the availability of the service instance associated with the first available connection pointer is re-checked. This may include requesting the pinger service update its status for the service instance associated with the first available connection pointer. This addresses the possibility that the service instance has become unavailable since the last update from the pinger service.

If the recheck is successful, at operation 214 the first available connection pointer is sent to the client application. If the recheck is unsuccessful, then the method 200 returns to operation 208.

If at operation 208 it is determined that there are no available connection pointers for the first service, then at operation 216 a license check is performed. If the license check is unsuccessful, then the method 200 ends. If the license check is successful, however, then at operation 218 a generator service automatically respawns the first service using a configuration file provided when the client application was registered with the failover framework.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
receiving a request for a first service from a client application;
determining that the first service is hooked to a failover framework;
in response to the determining, examining an available connection pointer pool to determine if there are any available connection pointers corresponding to the first service; and
in response to a determination that there are no available connection pointers corresponding to the first service:
accessing a configuration file associated with the client application; and
automatically respawning an instance of the first service using the configuration file.

Example 2. The system of Example 1, wherein the operations further comprise, in response to the determination that there are no available connection pointers corresponding to the first service:
performing a license check for a combination of the client application and the first service.

Example 3. The system of Examples 1 or 2, wherein the available connection pointer pool is updated to reflect changes in availability of instances of services and servers hosting the services by a pinger service.

Example 4. The system of Example 3, wherein the pinger service periodically requests current availability information from the first service.

Example 5. The system of any of Examples 1-4, wherein a connection pointer exists in the available connection pointer pool for every available instance of the first service.

Example 6. The system of Example 5, wherein an instance of the first service is available if it is up and running and also is functioning at a level of service above a minimum threshold.

Example 7. The system of any of Examples 1-6, wherein the configuration file is provided by the user associated with the client application when the client application is registered with the failover framework.

Example 8. The system of any of Examples 1-7, wherein the operations further comprise:
  receiving a second request for the first service from a second client application; and
  in response to a determination that there are available connection pointers corresponding to the first service:
    assigning one of the available connection pointers corresponding to the first service to the second client application.

Example 9. The system of Example 8, wherein the operations further comprise:
  verifying that the assigned one of the available connection pointers is associated with an instance of the first service that is still available; and
  in response to the verifying, sending the assigned one of the available connection pointers to the second client application.

Example 10. The system of Example 8, wherein, in response to a determination that there are a plurality of available connection pointers corresponding to the first service, determining whether any of the plurality of available connection pointers are associated with an instance of the first service that has been dedicated to a user other than a user of the second client application, and randomly selecting the one of the available connection pointers to assign to the second client application from available connection pointers not associated with an instance of the first service that has been dedicated to a user other than a user of the second client application Example 11. A method comprising:
  receiving a request for a first service from a client application;
  determining that the first service is hooked to a failover framework;
  in response to the determining, examining an available connection pointer pool to determine if there are any available connection pointers corresponding to the first service; and
  in response to a determination that there are no available connection pointers corresponding to the first service:
    accessing a configuration file associated with the client application; and
    automatically respawning an instance of the first service using the configuration file.

Example 12. The method of Example 11, further comprising, in response to the determination that there are no available connection pointers corresponding to the first service:
  performing a license check for a combination of the client application and the first service.

Example 13. The method of Examples 11 or 12, wherein the available connection pointer pool is updated to reflect changes in availability of instances of services and servers hosting the services by a pinger service.

Example 14. The method of Example 13, wherein the pinger service periodically requests current availability information from the first service.

Example 15. The method of any of Examples 11-14, wherein a connection pointer exists in the available connection pointer pool for every available instance of the first service.

Example 16. The method of Example 15, wherein an instance of the first service is available if it is up and running and also is functioning at a level of service above a minimum threshold.

Example 17. The method of any of Examples 11-16, wherein the configuration file is provided by the user associated with the client application when the client application is registered with the failover framework.

Example 18. The method of any of Examples 11-17, wherein the operations further comprise:
  receiving a second request for the first service from a second client application; and
  in response to a determination that there are available connection pointers corresponding to the first service:
    assigning one of the available connection pointers corresponding to the first service to the second client application.

Example 19. The method of Example 18, wherein the operations further comprise:
  verifying that the assigned one of the available connection pointers is associated with an instance of the first service that is still available; and
  in response to the verifying, sending the assigned one of the available connection pointers to the second client application.

Example 20. A non-transitory machine-readable medium storing instructions which, when executed by one or more processors, cause the one or more processors to perform operations comprising:
  receiving a request for a first service from a client application;
  determining that the first service is hooked to a failover framework;
  in response to the determining, examining an available connection pointer pool to determine if there are any available connection pointers corresponding to the first service; and
  in response to a determination that there are no available connection pointers corresponding to the first service:
    accessing a configuration file associated with the client application; and
    automatically respawning an instance of the first service using the configuration file.

Figure 3:
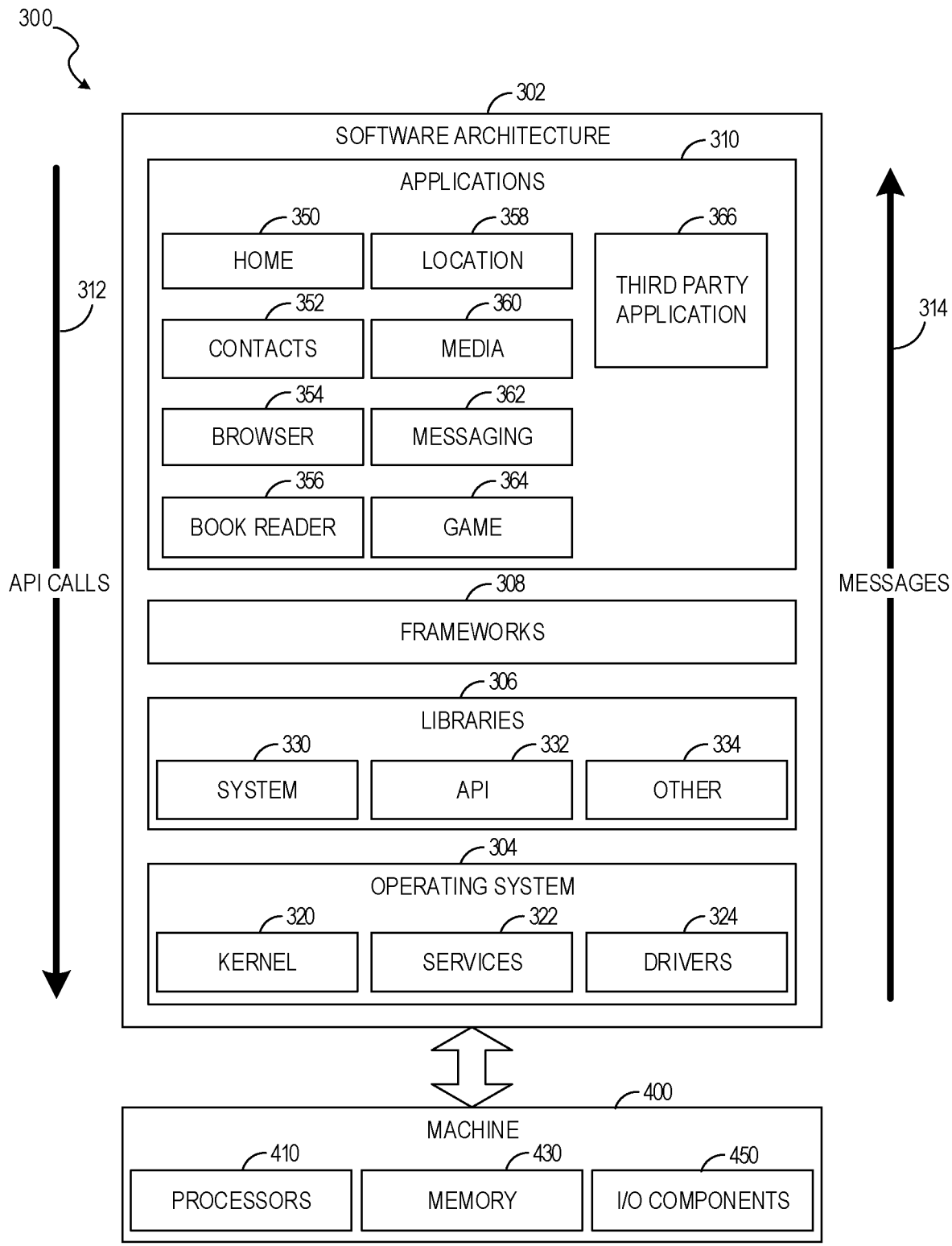
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionality. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various graphical user interface (GUI) functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
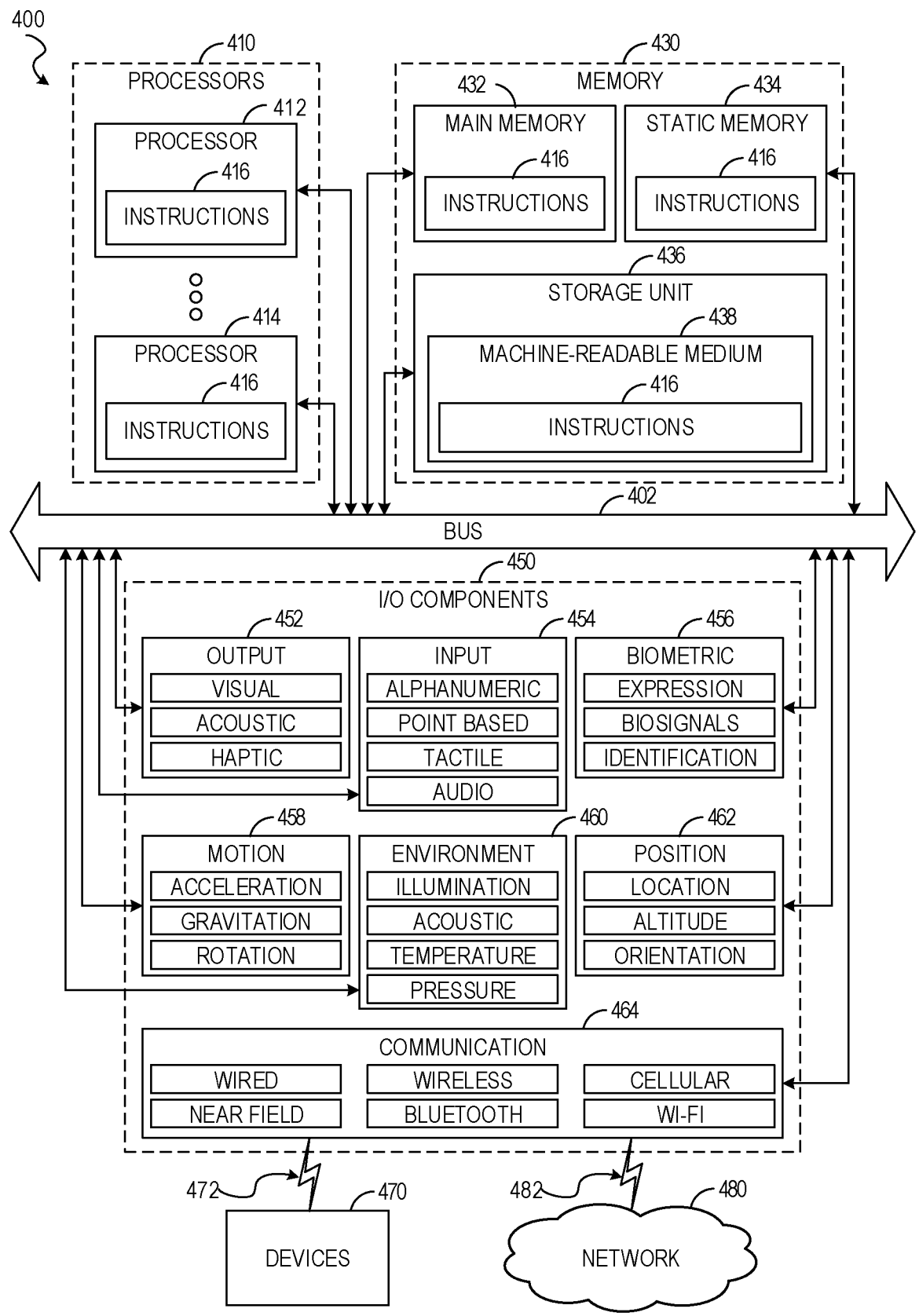
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (i.e., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media,"

"computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., Hypertext Transfer Protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving a request for a first service from a client application;
   determining that the first service is hooked to a failover framework;
   in response to the determining, examining an available connection pointer pool to determine if there are any available connection pointers corresponding to the first service, the available connection pointer pool being a group of available connection pointers provided for use by services; and
   in response to a determination that there are no available connection pointers corresponding to the first service:
   accessing a configuration file associated with the client application; and
   automatically respawning an instance of the first service using the configuration file.

2. The system of claim 1, wherein the operations further comprise, in response to the determination that there are no available connection pointers corresponding to the first service:
   performing a license check for a combination of the client application and the first service.

3. The system of claim 1, wherein the available connection pointer pool is updated to reflect changes in availability of instances of services and servers hosting the services by a pinger service.

4. The system of claim 3, wherein the pinger service periodically requests current availability information from the first service.

5. The system of claim 1, wherein a connection pointer exists in the available connection pointer pool for every available instance of the first service.

6. The system of claim 5, wherein an instance of the first service is available if it is up and running and also is functioning at a level of service above a minimum threshold.

7. The system of claim 1, wherein the configuration file is provided by a user associated with the client application when the client application is registered with the failover framework.

8. The system of claim 1, wherein the operations further comprise:
   receiving a second request for the first service from a second client application; and
   in response to a determination that there are available connection pointers corresponding to the first service:
   assigning one of the available connection pointers corresponding to the first service to the second client application.

9. The system of claim 8, wherein the operations further comprise:
   verifying that the assigned one of the available connection pointers is associated with an instance of the first service that is still available; and
   in response to the verifying, sending the assigned one of the available connection pointers to the second client application.

10. The system of claim 8, wherein, in response to a determination that there are a plurality of available connection pointers corresponding to the first service, determining whether any of the plurality of available connection pointers are associated with an instance of the first service that has been dedicated to a user other than a user of the second client application, and randomly selecting the one of the available connection pointers to assign to the second client application from available connection pointers not associated with an instance of the first service that has been dedicated to a user other than a user of the second client application.

11. A method comprising:
receiving a request for a first service from a client application;
determining that the first service is hooked to a failover framework;
in response to the determining, examining an available connection pointer pool to determine if there are any available connection pointers corresponding to the first service; and
in response to the determining, examining an available connection pointer pool to determine if there are any available connection pointers corresponding to the first service, the available connection pointer pool being a group of available connection pointers provided for use by services; and
accessing a configuration file associated with the client application; and
automatically respawning an instance of the first service using the configuration file.

12. The method of claim 11, further comprising, in response to the determination that there are no available connection pointers corresponding to the first service:
performing a license check for a combination of the client application and the first service.

13. The method of claim 11, wherein the available connection pointer pool is updated to reflect changes in availability of instances of services and servers hosting the services by a pinger service.

14. The method of claim 13, wherein the pinger service periodically requests current availability information from the first service.

15. The method of claim 11, wherein a connection pointer exists in the available connection pointer pool for every available instance of the first service.

16. The method of claim 15, wherein an instance of the first service is available if it is up and running and also is functioning at a level of service above a minimum threshold.

17. The method of claim 11, wherein the configuration file is provided by a user associated with the client application when the client application is registered with the failover framework.

18. The method of claim 11, further comprising:
receiving a second request for the first service from a second client application; and
in response to a determination that there are available connection pointers corresponding to the first service:
assigning one of the available connection pointers corresponding to the first service to the second client application.

19. The method of claim 18, further comprising:
verifying that the assigned one of the available connection pointers is associated with an instance of the first service that is still available; and
in response to the verifying, sending the assigned one of the available connection pointers to the second client application.

20. A non-transitory machine-readable medium storing instructions which, when executed by one or more processors, cause the one or more processors to perform operations comprising:
receiving a request for a first service from a client application;
determining that the first service is hooked to a failover framework;
in response to the determining, examining an available connection pointer pool to determine if there are any available connection pointers corresponding to the first service, the available connection pointer pool being a group of available connection pointers provided for use by services; and
in response to a determination that there are no available connection pointers corresponding to the first service:
accessing a configuration file associated with the client application; and
automatically respawning an instance of the first service using the configuration file.

* * * * *